United States Patent
Lee

(10) Patent No.: US 9,678,604 B2
(45) Date of Patent: Jun. 13, 2017

(54) DIGITIZER-INTEGRATED DISPLAY MODULE

(75) Inventor: Joo-Hoon Lee, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 390 days.

(21) Appl. No.: 13/344,041

(22) Filed: Jan. 5, 2012

(65) Prior Publication Data

US 2012/0169642 A1 Jul. 5, 2012

(30) Foreign Application Priority Data

Jan. 5, 2011 (KR) .................. 10-2011-0000865

(51) Int. Cl.
| | |
|---|---|
| *G06F 3/044* | (2006.01) |
| *G06F 1/18* | (2006.01) |
| *G06F 3/041* | (2006.01) |
| *G06F 3/046* | (2006.01) |
| *G06F 1/16* | (2006.01) |

(52) U.S. Cl.
CPC ............ *G06F 3/044* (2013.01); *G06F 1/1626* (2013.01); *G06F 1/1643* (2013.01); *G06F 1/182* (2013.01); *G06F 3/046* (2013.01); *G06F 3/0412* (2013.01); *G06F 2203/04106* (2013.01); *G06F 2203/04107* (2013.01)

(58) Field of Classification Search
CPC ....... G03F 3/046; G03F 3/03545; G03F 3/041
See application file for complete search history.

(56) References Cited

U.S. PATENT DOCUMENTS

| | | | |
|---|---|---|---|
| 4,631,356 A | 12/1986 | Taguchi et al. | |
| 5,274,198 A * | 12/1993 | Landmeier ................. 178/18.08 |
| 6,061,231 A * | 5/2000 | Crockett .................. 361/679.26 |
| 7,012,655 B2 * | 3/2006 | You et al. ........................ 349/12 |
| 2004/0031957 A1 * | 2/2004 | Tyan ................................ 257/40 |
| 2004/0104899 A1 | 6/2004 | Hong et al. | |
| 2004/0105040 A1 * | 6/2004 | Oh et al. .......................... 349/12 |
| 2004/0189887 A1 * | 9/2004 | You ..................... G02F 1/13338 349/58 |
| 2004/0189888 A1 | 9/2004 | Ypu et al. | |
| 2004/0263699 A1 | 12/2004 | Lee et al. | |

(Continued)

FOREIGN PATENT DOCUMENTS

| | | |
|---|---|---|
| EP | 2 093 651 | 8/2009 |
| JP | 6309085 | 11/1994 |

(Continued)

OTHER PUBLICATIONS

"Aluminium Foil—Wikipedia, the free encyclopedia", Internet, XP055213581, Nov. 8, 2011.

(Continued)

*Primary Examiner* — Nalini Mummalaneni
*Assistant Examiner* — Maheen Javed
(74) *Attorney, Agent, or Firm* — The Farrrell Law Firm, P.C.

(57) ABSTRACT

To provide a rigid digitizer-integrated display module, the display module includes a display panel for forming an image, a digitizer module formed on the bottom side of the display panel to detect electromagnetic type digitizer input, and a non-magnetic metal structure enclosing the bottom sides of the mold frame and the digitizer and the outer periphery of the mold frame.

8 Claims, 5 Drawing Sheets

(56) References Cited

U.S. PATENT DOCUMENTS

| | | | |
|---|---|---|---|
| 2005/0073626 A1* | 4/2005 | Yeom | G02F 1/133308 349/64 |
| 2005/0171714 A1 | 8/2005 | Ely et al. | |
| 2005/0264712 A1* | 12/2005 | Kim | G02F 1/133308 349/58 |
| 2006/0267580 A1* | 11/2006 | Fukushima | G06F 3/03545 324/207.13 |
| 2008/0158848 A1* | 7/2008 | Free | H05K 9/0075 361/818 |
| 2009/0002928 A1 | 1/2009 | Murakami | |
| 2009/0004408 A1* | 1/2009 | Nakanishi et al. | 428/12 |
| 2009/0184940 A1* | 7/2009 | Silk et al. | 345/173 |
| 2009/0231297 A1* | 9/2009 | Hatakeyama | 345/173 |
| 2010/0033447 A1* | 2/2010 | Horie | 345/174 |
| 2010/0066303 A1* | 3/2010 | Lam et al. | 320/106 |
| 2010/0188832 A1* | 7/2010 | Free et al. | 361/816 |
| 2010/0238073 A1 | 9/2010 | Liu et al. | |
| 2010/0302192 A1 | 12/2010 | Park et al. | |
| 2012/0087065 A1* | 4/2012 | Kim | G06F 1/1656 361/679.01 |
| 2012/0162127 A1* | 6/2012 | Onoda | G06F 3/0416 345/174 |

FOREIGN PATENT DOCUMENTS

| | | |
|---|---|---|
| JP | 10049287 | 2/1998 |
| JP | 2006309308 | 11/2006 |
| KR | 1020040042487 | 5/2004 |
| KR | 1020050000795 | 1/2005 |
| KR | 1020100030561 | 3/2010 |

OTHER PUBLICATIONS

European Search Report dated Sep. 22, 2015 issued in counterpart application No. 12150193.6-1972, 11 pages.
Korean Office Action dated Nov. 28, 2016 issued in counterpart application No. 10-2011-0000865, 9 pages.

* cited by examiner

DIGITIZER-INTEGRATED DISPLAY MODULE

PRIORITY

This application claims priority under 35 U.S.C. §119(a) to an application entitled "Digitizer-Integrated Display Module" filed in the Korean Intellectual Property Office on Jan. 5, 2011 and assigned Serial No. 10-2011-0000865, the contents of which are incorporated herein by reference.

BACKGROUND OF THE INVENTION

1. Field of the Invention

The present invention relates generally to a display module, and more particularly, to an EMR (ElectroMagnetic Resonance) type digitizer-integrated display module.

2. Description of the Related Art

An LCD (Liquid Crystal Display) module is adapted to display desired images by controlling a light transmissivity of each of liquid crystal cells arranged in a matrix form in accordance with image signal information.

An LCD module may be equipped with a digitizer for inputting an electric graphic signal while simultaneously displaying an image. The LCD module equipped with such a digitizer is often employed in such devices as a personal portable terminal, an all-in-one PC (Personal Computer), a tablet PC, a smart phone, or a PMP (Portable Multimedia Player). Unlike an input device, such as a mouse or a keyboard, the digitizer receives information concerning one or more positions designated by a user on a screen. As a result, the digitizer is suitable for conducting graphic work such as a CAD (Computer Aided Design), and is frequently used to provide an intuitive and convenient user interface.

Such a digitizer is also referred to as touch screen or EGIP (Electric Graphic Input Panel), and is classified into a resistive, capacitive, EMR (ElectroMagnetic Resonance) or electromagnetic type in accordance with the manner in which the digtizer detects one or more positions designated by the user.

The resistive type digitizer senses one or more positions pushed by pressure on the basis of a change in amount of current in a state in which a Direct Current (DC) voltage is applied to the digitizer, in which two thin conductive layers on a screen sense that they are directly touched on the basis of pressure by a finger or a stylus pen. Since the resistive type senses the positions on the basis of pressure, the conductance of the object to be sensed is immaterial.

The capacitive type digitizer senses one or more positions using capacitance coupling in a state in which an Alternating Current (AC) voltage is applied to the digitizer, in which the object to be sensed should be a conductor, and a contact area not less than a predetermined extent is needed so as to change the sensible electrostatic capacitance. Although, such a capacitive type digitizer does not have a problem in sensing a position when inputting is conducted using a human finger, this digitizer has difficulty sensing a position when inputting is conducted using a conductor tip since due to the small size of the contact area of the conductive tip.

Meanwhile, the electromagnetic resonance type digitizer employs a digitizer sensor substrate including a plurality of coils, and is driven by AC signals so that a pen produces a vibrating magnetic field when a user moves the pen. The vibrating magnetic field induces signals in the coils, through which signals the electromagnetic resonance type digitizer detects the position of the pen.

FIG. 1 illustrates an operating principal of a conventional electromagnetic type digitizer. As shown in FIG. 1, the electromagnetic type digitizer has a plurality of antenna coils 133 patterned on a digitizer sensor substrate 131, and is adapted to detect the position of a pen 117 by sensing a signal produced from a resonance circuit 117a provided within the pen 117. The sensed signal 137 passes a signal reception circuit 139 by which the position of the pen is recognized.

In this manner, the electromagnetic type digitizer has plural coils mounted on the digitizer substrate, and senses an electromagnetic change caused by the approach of the pen to determine the position of the pen. Therefore, unlike a resistive type digitizer, the electromagnetic digitizer does not need to be arranged on the front side of a display module, but may instead be mounted on the rear side of the display module.

FIG. 2 illustrates a display which is equipped with a conventional digitizer. Referring to FIG. 2, the display with a conventional digitizer has an LCD module including a liquid crystal panel 10 having a front polarizer 13, a thin film transistor substrate 11, a color filter substrate 12, and a rear polarizer, a backlight assembly having optical sheets 21, a light guide plate 22, a reflecting sheet 23, and a lamp unit 24, a mold frame 30 supporting the liquid crystal panel 10 and the backlight assembly 20, and a metal bracket 40 enclosing the periphery of the mold frame 30, and in which a digitizer module 50 is positioned under the LCD module, the digitizer module 50 including an EMR sensor substrate 51, a magnetic sheet 52 and an electromagnetic shield substrate 53.

The liquid crystal panel 10 has a plurality of liquid crystal cells arranged in a matrix form, and each of which forms a pixel unit. The liquid crystal panel 10 forms an image by controlling the light transmissivity of each of the liquid crystal cells in accordance with image signal information transmitted from a controller (not shown).

The backlight assembly 20 includes a light guide plate 22 arranged parallel to the rear side of the liquid crystal panel 10, a lamp unit 24 arranged along at least one side edge of the light guide plate 22 to supply light, optical sheets 21 provided on the front side of the light guide plate 22 to diffuse and concentrate light directed toward the liquid panel 10, and a reflecting sheet 23 provided on the rear side of the light guide plate 22.

In such a conventional digitizer-integrated display module, a metallic structure, which interferes with an electromagnetic field produced from the EMR sensor substrate 51, does not exist between the LCD module and the EMR sensor substrate 51. Therefore, a robust design of a display module should be conducted through an application of a frame on the periphery of the display module, and an electromagnetic shield substrate 53 should be provided under the EMR sensor substrate 51, in which the electromagnetic shield substrate prevents electromagnetic interference with a main board arranged under the digitizer module 50.

Thinning of an electronic appliance has become an important issue when developing such an electronic appliance. As a result, securing the rigidity of a display module with a minimal thickness and a minimal Bezel area has become a core technology in developing a display and a display set. However, the conventional digitizer-integrated display requires a wide Bezel area due to the side metal bracket structure, and is limited as to rigidity in the entire module due to the non-existence of a metal structure under the LCD module. In order to compensate for this deficiency, a thicker and highly rigid side frame and mold frame are required, which will inevitably increase the Bezel width and the thickness of the entire display module.

In order to avoid the interference of the EMR sensor substrate 51 with an internal circuit positioned below the EMR sensor substrate 51, one or more additional parts, such as the electromagnetic shield substrate 53, are required, which will inevitably cause an increase of the Bezel width and the thickness of the entire display module. Even if an additional part is used as shown in FIG. 2, it is difficult to shield the periphery of the EMR sensor substrate 51. As a result, interference occurs between the main board and the EMR sensor substrate 51, which may cause a malfunction of the digitizer or communication function.

As a result, there is a need in the art for a digitizer-integrated display module which is configured with a narrow Bezel while securing the rigidity of the display, and of which the thickness is not substantially increased.

SUMMARY OF THE INVENTION

Accordingly, an aspect of the present invention is to solve the above-mentioned problems occurring in the prior art, and to provide a rigid digitizer-integrated display module with a narrow Bezel and slim thickness.

In accordance with an aspect of the present invention, there is provided a digitizer-integrated display module including a display panel for forming an image, a digitizer module formed on the bottom side of the display panel to detect electromagnetic type digitizer input, and a non-magnetic metal structure enclosing the periphery of the display panel and the periphery and bottom side of the digitizer module.
T In accordance with another aspect of the present invention, there is provided a digitizer-integrated display module including a display panel for forming an image, a digitizer module formed on the bottom side of the display panel to detect an electromagnetic type digitizer input, a magnetic metal structure enclosing the periphery of the display panel and the periphery and bottom side of the digitizer module, and a non-magnetic metal structure enclosing the periphery and bottom side of the magnetic metal structure.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF EMBODIMENTS OF THE PRESENT INVENTION

Figure 1:
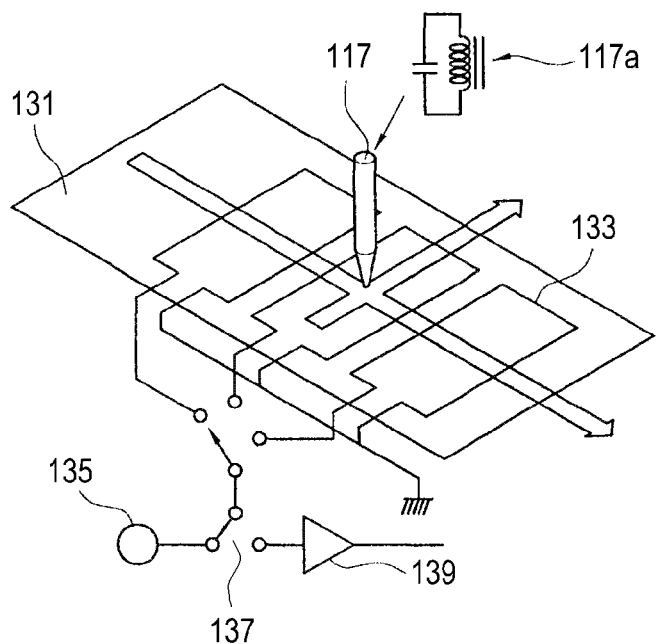
FIG. 1 illustrates an operating principal of a conventional electromagnetic type digitizer.
Figure 2:
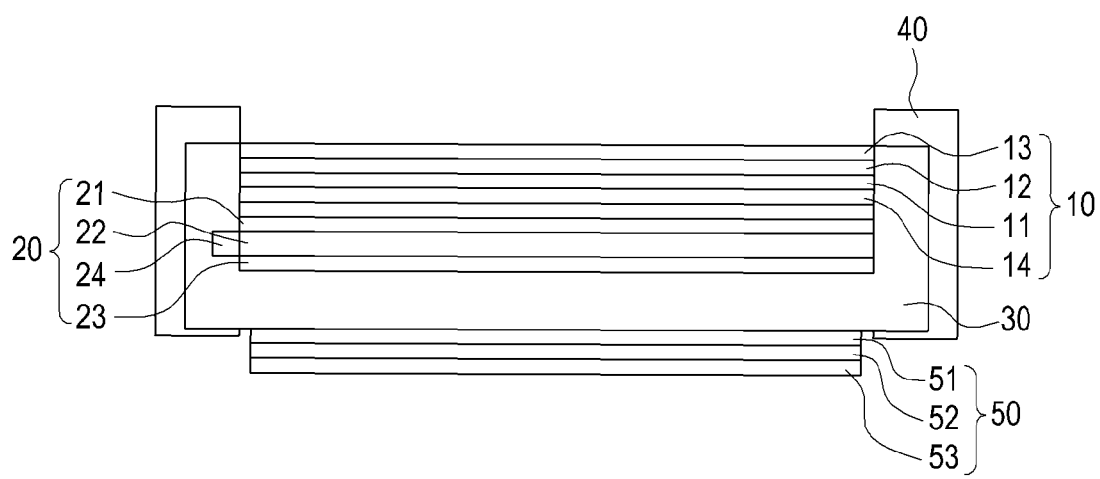
FIG. 2 illustrates a structure of a display equipped with a conventional digitizer.

Hereinafter, embodiments of the present invention will be described with reference to the accompanying drawings. In the following description, the same elements will be designated by the same reference numerals although they are shown in different drawings. Further, various specific definitions found in the following description are provided only to help general understanding of the present invention, and it is apparent to those skilled in the art that the present invention can be implemented without such definitions. Further, a detailed description of known functions and configurations incorporated herein will be omitted for the sake of clarity and conciseness.

Figure 3:
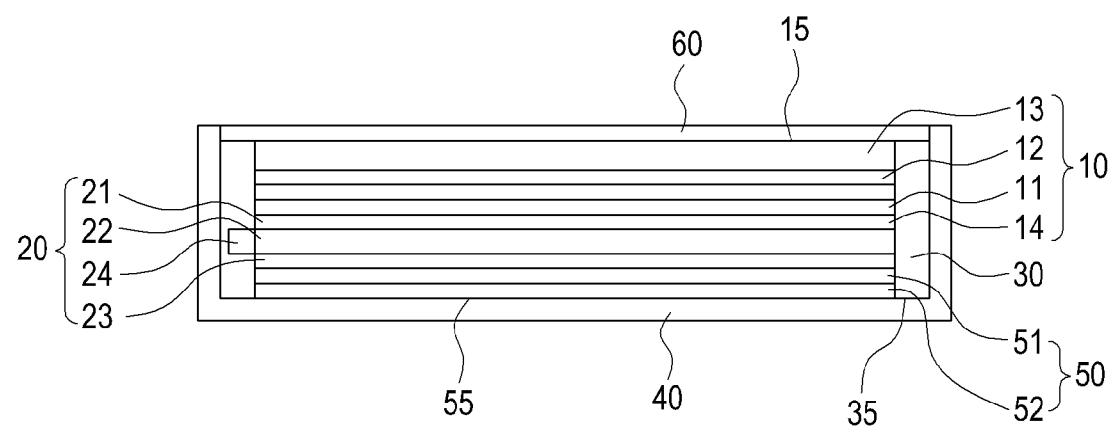
FIG. 3 illustrates a laminated structure of a digitizer-integrated display in accordance with a first embodiment of the present invention.

FIG. 3 illustrates a laminated structure of a digitizer-integrated display in accordance with a first embodiment of the present invention.

Referring to FIG. 3, the digitizer-integrated display module includes a touch screen panel 60 formed on a top (15) of a liquid crystal panel 10 for conducting electrostatic capacitive type touch input, the liquid crystal panel 10 positioned under the touch screen panel 60 and including a front polarizer 13, a thin film transistor substrate 11, a color filter substrate 12, and a rear polarizer 14, a backlight assembly 20 positioned under the liquid crystal panel 10 and including optical sheets 21, a light guide plate 22, a reflecting sheet 23, and a lamp unit 24, a digitizer module 50 positioned below the backlight assembly 20 and including an EMR sensor 51 and a magnetic sheet 52, a vertically opened mold frame 30 directly contacting and enclosing the peripheries of the touch screen module 60, the liquid crystal panel 10, the backlight assembly 20 and the digitizer module 50, and a metal bracket 40 enclosing the outer periphery of the mold frame 30, and supporting and enclosing the bottom sides (35, 55) of the mold frame 30 and the digitizer module 50. The liquid crystal panel 10 and the backlight assembly 20 form an ordinary Thin Film Transistor Liquid Crystal Display (TFT-LCD) type display panel.

Figure 4:
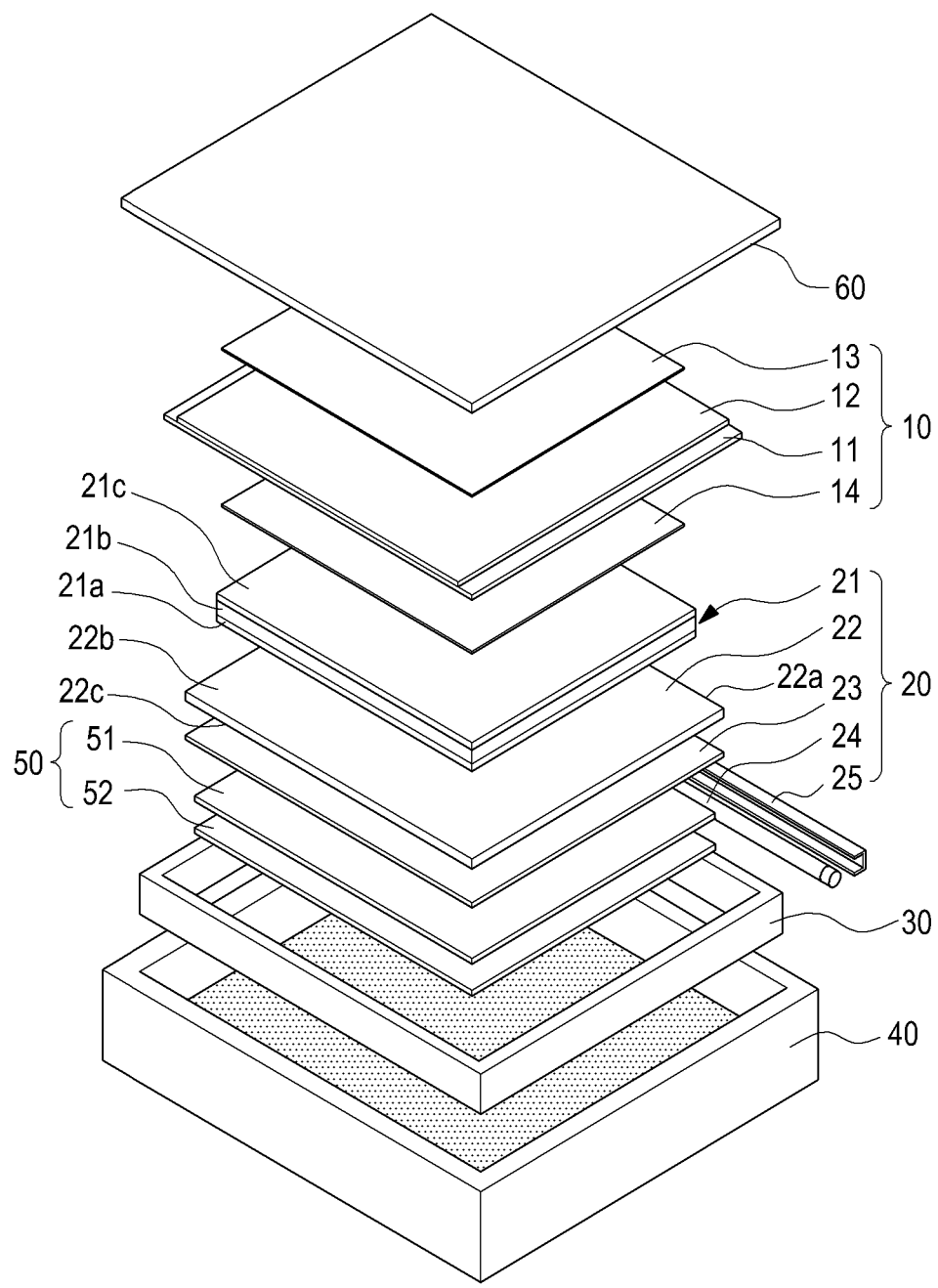
FIG. 4 is an exploded view of the digitizer-integrated display in accordance with the first embodiment of the present invention.

FIG. 4 is an exploded view of the digitizer-integrated display in accordance with the first embodiment of the present invention.

As can be seen in more detail from FIG. 4, the digitizer-integrated display module in accordance with the first embodiment of the present invention includes a liquid panel 10 for forming an image, a backlight assembly 20 positioned on the rear side of the liquid crystal panel 10 to illuminate light on the rear side of the liquid crystal panel 10, a digitizer module 50 positioned on the rear side of the backlight assembly 20 to detect an electromagnetic type digitizer input, a vertically opened mold frame 30 enclosing the peripheries of the liquid crystal panel 10, the backlight assembly 20 and the digitizer module 50, and a metal bracket 40 supporting the liquid crystal panel 10, the backlight assembly 20, the digitizer module 50 and the mold frame 30, enclosing the liquid crystal panel 10, enclosing the peripheries of the liquid crystal panel 10, the backlight assembly 20, and the digitizer module 50, and enclosing the bottom side of the digitizer module 50.

The liquid crystal panel 10 includes a thin film transistor substrate 11, a color filter substrate 12 attached to and opposing the thin film transistor substrate 11, and liquid crystal (not shown) introduced between the thin film transistor substrate 11 and the color filter substrate 12. The liquid crystal is introduced and sealed between the thin film transistor substrate 11 and the color filter substrate 12. The liquid crystal panel 10 further includes a front polarizer 13 attached to the front side of the color filter substrate 12, and a rear polarizer 14 attached to the rear side of the thin film transistor substrate 11. The liquid panel 10 has liquid crystal cells arranged in a matrix form, each of which forms a pixel unit in which the liquid display panel 10 displays an image by controlling the light transmissivity of each of the liquid crystal cells in accordance with an image signal input from a controller.

The thin film transistor substrate 11 has a plurality of gate lines and data lines which are formed in a matrix form, and a TFT is formed at each of the intersection points of the gate lines and the data lines. A signal voltage applied through such a thin film transistor is applied to the liquid crystal through pixel electrodes connected to the thin film transistor, and the liquid crystal is arranged in accordance with the signal, thereby determining the light transmissivity.

The color filter substrate 12 has a color filter including Red, Green, Blue (RGB) pixels exhibiting a predetermined color when light passes the pixels, and transparent common electrodes (Indium Tin Oxide, ITO). The color filter substrate 12 has a small area as compared to the thin film transistor substrate 11, in which an overlapping part between the color filter substrate 12 and the thin film transistor substrate 11 forms a display region of the liquid crystal panel 10, and a non-overlapping marginal part forms a non-display region of the liquid crystal panel 10.

The front polarizer 13 and the rear polarizer 14 are arranged to execute cross-polarization, in which the rear polarizer 14 polarizes light incident to the liquid crystal panel 10, and the front polarizer 13 serves as an analyzer.

The backlight assembly 20 includes a light guide plate 22 arranged parallel to the rear side of the liquid crystal panel 10, a lamp unit 24 arranged along at least one side edge of the light guide plate 22, a lamp reflector 25 receiving the lamp unit 24 and allowing all the light illuminated from the lamp unit 24 to be directed toward the light guide plate 22, optical sheets 21 provided on the front side of the light guide plate 22 to diffuse and concentrate the light directed toward the liquid crystal panel 10, and a reflecting sheet 23 provided on the rear side of the light guide plate 22.

The light guide plate 22 has an incident face (22a) for receiving the light from the lamp unit 22, an emergent face (22b) perpendicular to the incident face (22a) and parallel to the liquid crystal panel 10, and a rear side (22c) having a pattern formed to allow the light illuminated to the incident face (22a) from the lamp unit 24 to progress toward the emergent face (22b). As a result, the light guide plate 22 changes light illuminated to the incident face (22a) from the lamp unit 24 arranged along one side edge of the light guide plate 22, i.e. adjacent to the incident face (22a) into plane light, and uniformly transmits the plane light to the liquid crystal panel 10 through the emergent face (22b). Typically, such a light guide plate 22 may be formed from PMMA (PolyMethylMethAcrylate) which is strong enough to resist deforming or fracturing, and has a high transmissivity.

The optical sheets 21 include a diffusion sheet (21a) for diffusing light illuminated to the liquid crystal panel 10 from the light guide plate 22 so as to prevent the liquid crystal panel 10 from staining due to the partial concentration of the light, thereby further improving the uniformity of the light, and a prism sheet (21b) for allowing the light coming out through the diffusion sheet to progress perpendicularly, thereby improving brightness. In addition, the optical sheets 21 may further include a protection sheet (21c) to protect the diffusion sheet (21a) and prism sheet (21b) which are sensitive to dust or scratches, and to prevent external impact or inflow of foreign matter. In such optical sheets 21, the diffusion sheet (21a), the prism sheet (21b) and the protection sheet (21c) are typically laminated sequentially in this order.

The reflection sheet 23 reflects light, which is transmitted opposite to the liquid crystal panel 10 through the light guide plate 22, toward the light guide plate 22 again. As a result, the reflection sheet 23 can reduce the loss of light and improve the uniformity of light transmitted toward the liquid crystal panel 10 from the light guide plate 22.

The digitizer module 50 includes an EMR sensor substrate 51, on which a plurality of loop coils are arranged to detect the position of an electromagnetic field produced as a pen, which is employed for an electromagnetic type digitizer, approaches the substrate, and a magnetic sheet 52 formed on the bottom side of the EMR sensor substrate 51, the magnetic sheet 52 being formed from a magnetic material to induce the formation of the electromagnetic field on the EMR sensor substrate 51.

The EMR sensor substrate 51 may include one set of rectangular loop coils arranged in a row in one direction in such a manner that the loop coils partially overlap each other, and another set of rectangular loop coils arranged in a direction perpendicular to the one set of rectangular loop coils in the same manner.

As shown in FIG. 4, the mold frame 30 encloses the peripheries of the liquid crystal panel 10, the backlight assembly 20 and the digitizer module 50, and is vertically opened. With the help of such a mold frame 30, it is possible to reduce the entire thickness of the display module. Meanwhile, a space (not shown) may be formed at one side of the mold frame 30 to receive the lamp unit 24 and the lamp reflector 25.

The metal bracket 40 is formed in a shape supporting the liquid crystal panel 10, the backlight assembly 20, the digitizer module 50 and the mold frame 30, enclosing the outer periphery of the mold frame 30, and supporting the entirety of the digitizer module 50 and the mold frame 30. The metal bracket 40 of the present embodiment may be formed from a non-magnetic metal, preferably from magnesium, aluminum or SUS (Steel Use Stainless). The metal bracket 40 serves to secure the rigidity of the display module.

In accordance with the display module of the present embodiment, the EMR sensor substrate 51 and the magnetic sheet 52 positioned under the EMR sensor substrate 51 are received in the metal bracket 40, so that an electromagnetic signal produced by the magnetic sheet does not suffer from attenuation by the metal bracket, and the digitizer module 50 is completely separated from a main board (not shown) positioned below the display module by the metal bracket, in order to prevent an electromagnetic interference by any other circuit within the final display device.

In addition, the present embodiment may further include, under the metal bracket 40, a main board (not shown) for controlling individual components of the entirety of the display device including the display module, for controlling the display module to form an image to be displayed, and for processing a signal input from the display module, and a power source (not shown) for supplying power for the entirety of the display device.

Although of the embodiment of FIGS. 3 and 4 illustrate a display device in which an LCD panel and a digitizer module are combined with each other, it is possible to configure a digitizer-integrated display module by using a conventional OLED (Organic Light Emitting Diode) display panel in a manner similar to the construction shown in FIGS. 3 and 4.

In such a case, the display module may include an ordinary OLED display panel having a top electrode, an organic layer, a bottom electrode and a substrate, instead of the liquid crystal panel 10 and the backlight assembly 20, and in accordance with the present invention, the digitizer module 50 is positioned on the bottom side of the OLED substrate.

In this case, the display module would include a vertically opened mold frame enclosing the peripheries of the touch screen panel, the OLED display panel and the digitizer module, and a metal bracket enclosing the bottom sides of the digitizer module and the mold frame and enclosing the external periphery of the mold frame.

Figure 5:
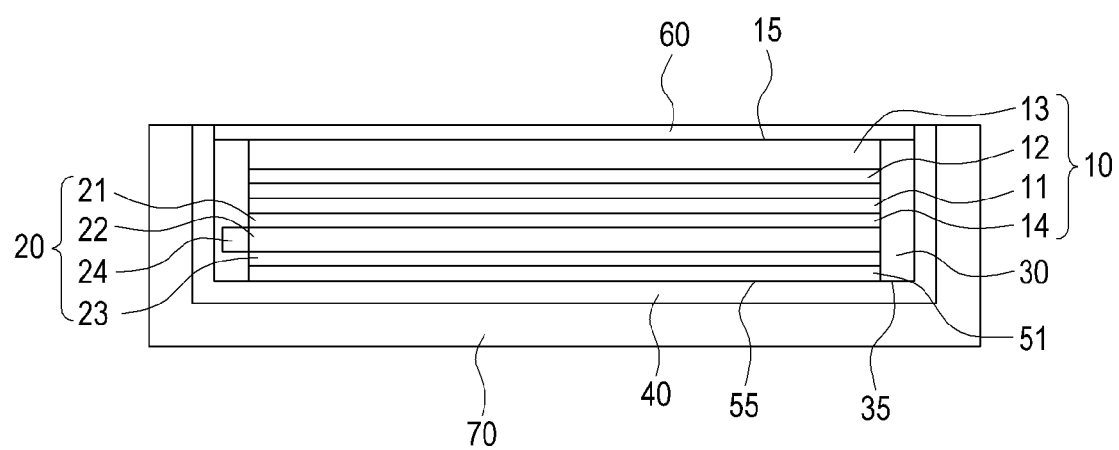
FIG. 5 illustrates a laminated structure of a digitizer-integrated display in accordance with a second embodiment of the present invention.

FIG. 5 illustrates a laminated structure of a digitizer-integrated display in accordance with a second embodiment of the present invention.

Referring to FIG. 5, the digitizer-integrated display module includes a touch screen panel 60 formed on a top (15) of a liquid crystal panel 10 for conducting electrostatic capacitive type touch input, a liquid crystal panel 10 positioned under the touch screen panel 60 and including a front polarizer 13, a thin film transistor substrate 11, a color filter substrate 12, and a rear polarizer 14, a backlight assembly 20 positioned under the liquid crystal panel 10 and including optical sheets 21, a light guide plate 22, a reflecting sheet 23, and a lamp unit 24, a digitizer module 51 positioned below the backlight assembly 20 and including an EMR sensor 51, a vertically opened mold frame 30 directly contacting with and enclosing the peripheries of the touch screen module 60, the liquid crystal panel 10, the backlight assembly 20 and the digitizer module 51, a first bracket 40 receiving the liquid crystal panel 10, the backlight assembly 20, the digitizer module 51 and the mold frame 30, enclosing the outer periphery of the mold frame 30, and enclosing the bottom sides (35, 55) of the mold frame 30 and the digitizer module 51; and a second bracket 70 enclosing the outer periphery and the bottom side of the first bracket 40.

The liquid crystal panel 10 and the backlight assembly 20 form an ordinary TFT-LCD type display panel.

Figure 6:
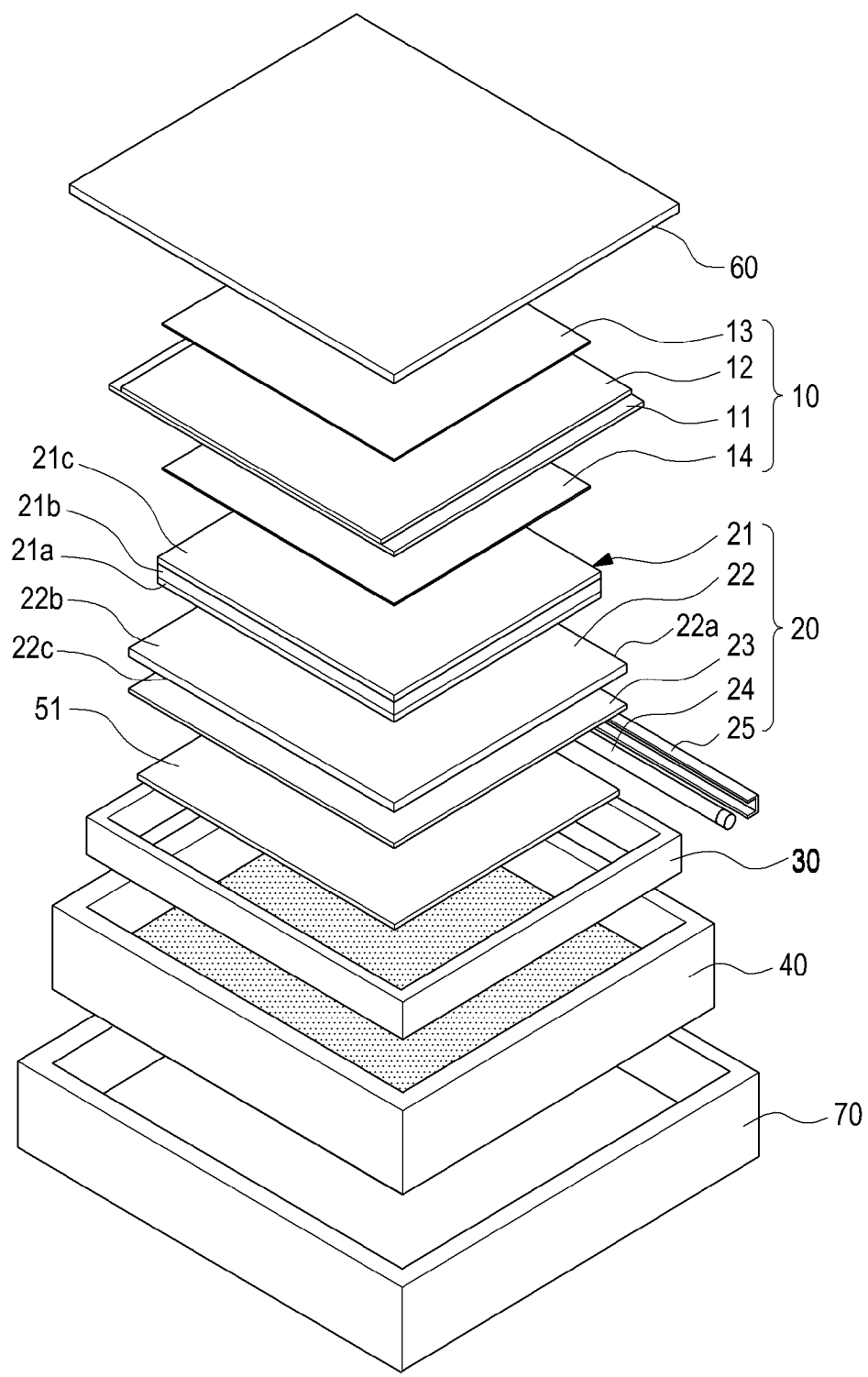
FIG. 6 is an exploded view of the digitizer-integrated display in accordance with the second embodiment of the present invention.

FIG. 6 is an exploded view of the digitizer-integrated display in accordance with the second embodiment of the present invention.

As can be seen in more detail from FIG. 6, the digitizer-integrated display module in accordance with the second embodiment of the present invention includes: a touch screen panel 60, a liquid panel 10 for forming an image, a backlight assembly 20 positioned on the rear side of the liquid crystal panel 10 to illuminate light on the rear side of the liquid crystal panel 10, a digitizer module 51 for detecting a digitizer input of electromagnetic type, a vertically opened mold frame 30 enclosing the peripheries of the liquid crystal panel 10, the backlight assembly 20 and the digitizer module 51, a first bracket 40 enclosing the outer periphery of the mold frame 30 and enclosing the entirety of the bottom sides of the digitizer module 51 and the mold frame 30, and a second bracket enclosing the outer periphery and the bottom side of the first bracket 40.

As shown in FIG. 6, the vertically opened mold frame 30 is formed to enclose the outer peripheries of the liquid crystal panel 10, the backlight assembly 20 and the digitizer module 51. The mold frame 30 helps reduce the thickness of the display module.

In order to secure durability, the display module in accordance with the second embodiment of the present invention additionally includes a second bracket 70. The second bracket may be formed from a metal or a rigid plastic material.

The first bracket may be formed from a magnetic metal, such as a silicon-based iron (Fe). As a result, the magnetic sheet of the first embodiment may be removed. The second bracket 70 may be formed from a non-magnetic material, such as magnesium, aluminum or SUS (Steel Use Stainless). Use of this bracket structure secures the rigidity of the display module.

Although a construction of a display device, in which an LCD panel and a digitizer module are combined with each other, was disclosed in the present embodiment, it is possible to configure a digitizer-integrated display module by using a conventional OLED display panel in a manner similar to the construction shown in FIGS. 5 and 6.

In this case, the display module may include an ordinary OLED display panel having a top electrode, an organic layer, a bottom electrode and a substrate, instead of the liquid crystal panel 10 and the backlight assembly 20, and in accordance with the present invention, the digitizer module 51 is positioned on the bottom side of the OLED substrate.

In addition, the display module may include a vertically opened mold frame enclosing the peripheries of the touch screen panel, the OLED display panel and the digitizer module, a first bracket supporting the OLED display panel, the digitizer module and the mold frame, enclosing the bottom sides of the digitizer module and the mold frame, and enclosing the external periphery of the mold frame, and a second bracket enclosing the outer periphery and bottom side of the first bracket. In this case, the first bracket may be formed from a magnetic material, the magnetic sheet of the digitizer module may be removed, and the second bracket may be formed from a non-magnetic material. In addition, the digitizer-integrated display module may include a non-magnetic metal structure enclosing the bottom sides and peripheries of the display panel and the digitizer module.

The present invention discloses a metal bracket structure that provides an electromagnetic noise shielding function and a mechanical rigidity enhancing effect, whereby the present invention provides an EMR digitizer-integrated display module that reduces the Bezel and thickness of a display module and secures rigidity of the display module. In addition, by mounting an electrostatic capacitive touch screen panel on the top side of an LCD module, and providing an electromagnetic type digitizer module on the bottom side of the LCD module, the present invention provides a display module which enables both a touch input using a user's fingers and a digitizer input using an electromagnetic type pen.

While the invention has been shown and described with reference to certain embodiments thereof, it will be understood by those skilled in the art that various changes in form and details may be made therein without departing from the spirit and scope of the invention as defined by the appended claims.

What is claimed is:

1. A display device comprising:
   a display panel for forming an image;
   a digitizer module formed below the display panel to detect electromagnetic type digitizer input;
   a magnetic metal structure enclosing sides of the display panel and entirety of sides and a bottom side of the digitizer module; and
   a non-magnetic metal structure enclosing a periphery and a bottom side of the magnetic metal structure.

2. The display device as claimed in claim 1, further comprising a touch panel formed on a top of the display panel.

3. The display device as claimed in claim 1, wherein the display panel comprises:
   a liquid crystal panel for forming an image; and
   a backlight panel positioned under the liquid crystal panel to illuminate light to the rear side of the liquid crystal panel.

4. The display device as claimed in claim 1, wherein the display panel comprises:
   a substrate formed on the digitizer module;
   a bottom electrode formed on the substrate;
   an organic layer formed on the bottom electrode; and
   a top electrode formed on the organic layer.

5. The display device as claimed in claim 1, wherein the digitizer module comprises:
   an Electro Magnetic Resonance (EMR) sensor substrate positioned on the bottom side of the display panel and having a plurality of loop coils arranged on the EMR sensor substrate to detect an electromagnetic field produced by a pen for an electromagnetic type digitizer.

6. The display device as claimed in claim 1, wherein the non-magnetic metal structure is formed from one of aluminum, magnesium and non-magnetic SUS (Steel Use Stainless).

7. The display device as claimed in claim 1, wherein the magnetic metal structure is formed from a silicon-based iron.

8. The display device as claimed in claim 1, further comprising:
   a mold frame enclosing the sides of the display panel and the digitizer module, the mold frame being opened vertically, wherein the magnetic metal structure encloses a bottom side of the mold frame and the digitizer module, and sides of the mold frame.

* * * * *